United States Patent
Hausmann et al.

(10) Patent No.: US 9,882,230 B2
(45) Date of Patent: Jan. 30, 2018

(54) FUEL CELL STACK

(71) Applicant: Daimler AG, Stuttgart (DE)

(72) Inventors: Philipp Hausmann, Kirchheim (DE); Matthias Jesse, Dettingen (DE); Cosimo Mazzotta, Ulm (DE)

(73) Assignee: Daimler AG, Stuttgart (DE)

( * ) Notice: Subject to any disclaimer, the term of this patent is extended or adjusted under 35 U.S.C. 154(b) by 103 days.

(21) Appl. No.: 14/436,352

(22) PCT Filed: Oct. 9, 2013

(86) PCT No.: PCT/EP2013/003031
§ 371 (c)(1),
(2) Date: Apr. 16, 2015

(87) PCT Pub. No.: WO2014/060078
PCT Pub. Date: Apr. 24, 2014

(65) Prior Publication Data
US 2015/0318562 A1 Nov. 5, 2015

(30) Foreign Application Priority Data

Oct. 17, 2012 (DE) .......... 10 2012 020 294

(51) Int. Cl.
*H01M 8/24* (2016.01)
*H01M 8/2483* (2016.01)
(Continued)

(52) U.S. Cl.
CPC ....... *H01M 8/2483* (2016.02); *H01M 8/0258* (2013.01); *H01M 8/0263* (2013.01);
(Continued)

(58) Field of Classification Search
None
See application file for complete search history.

(56) References Cited

U.S. PATENT DOCUMENTS

| 4,543,303 A | 9/1985 | Dantowitz et al. |
| 2003/0211374 A1* | 11/2003 | Dehne ............... H01M 8/04059 429/414 |

(Continued)

FOREIGN PATENT DOCUMENTS

| DE | 33 23 491 A1 | 1/1984 |
| DE | 103 04 657 A1 | 9/2003 |

(Continued)

OTHER PUBLICATIONS

German Search Report dated Jul. 16, 2013 with partial English-language translation (ten (10) pages).
International Search Report (PCT/ISA/210) dated Mar. 5, 2014 with English language translation (six (6) pages).
German-language Written Opinion (PCT/ISA/237) dated Mar. 5, 2014 (five (5) pages).

*Primary Examiner* — Barbara Gilliam
*Assistant Examiner* — Wyatt McConnell
(74) *Attorney, Agent, or Firm* — Crowell & Moring LLP

(57) ABSTRACT

A fuel cell stack has a multiplicity of individual cells, which each include an anode flow field, a membrane electrode arrangement, and a cathode flow field. Each flow field has a media inlet and channels for carrying the media. The anode flow fields and/or the cathode flow fields have the media inlet on their upward-facing side when used as intended, and are open on their downward-facing side when used as intended.

14 Claims, 2 Drawing Sheets

(51) Int. Cl.
*H01M 8/0258* (2016.01)
*H01M 8/2485* (2016.01)
*H01M 8/04089* (2016.01)
*H01M 8/1004* (2016.01)
*H01M 8/0271* (2016.01)
*H01M 8/241* (2016.01)
*H01M 8/0263* (2016.01)
*H01M 8/04119* (2016.01)
*H01M 8/04082* (2016.01)
*H01M 8/1018* (2016.01)

(52) U.S. Cl.
CPC ..... *H01M 8/0271* (2013.01); *H01M 8/04097* (2013.01); *H01M 8/04156* (2013.01); *H01M 8/04201* (2013.01); *H01M 8/1004* (2013.01); *H01M 8/241* (2013.01); *H01M 8/2485* (2013.01); *H01M 2008/1095* (2013.01); *H01M 2300/0082* (2013.01)

(56) References Cited

U.S. PATENT DOCUMENTS

| | | |
|---|---|---|
| 2004/0043279 A1 | 3/2004 | Rapaport et al. |
| 2004/0202911 A1 | 10/2004 | Komura et al. |
| 2007/0122681 A1 | 5/2007 | Hong |
| 2010/0209798 A1 | 8/2010 | Nunokawa et al. |
| 2011/0183230 A1 | 7/2011 | Hornburg |

FOREIGN PATENT DOCUMENTS

| | | |
|---|---|---|
| DE | 10 2006 039 105 A1 | 2/2008 |
| DE | 103 93 165 B4 | 11/2012 |
| EP | 1 852 931 A1 | 11/2007 |
| JP | 2011-9137 A | 1/2011 |
| WO | WO 2005/048389 A2 | 5/2005 |

\* cited by examiner

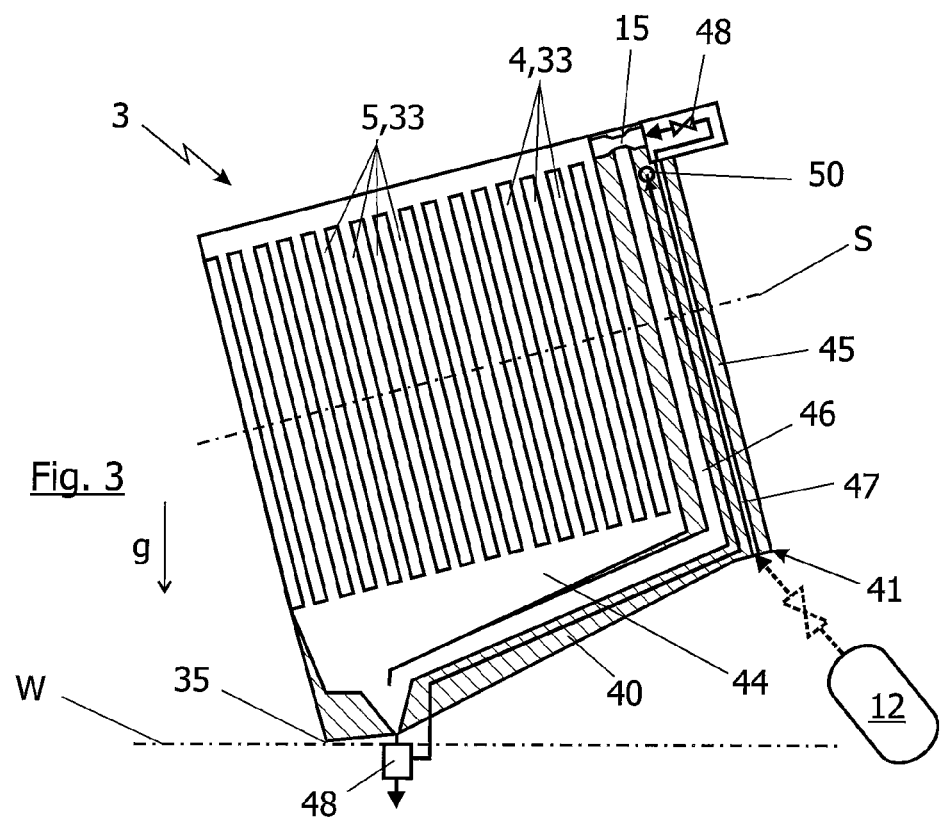
Fig. 3
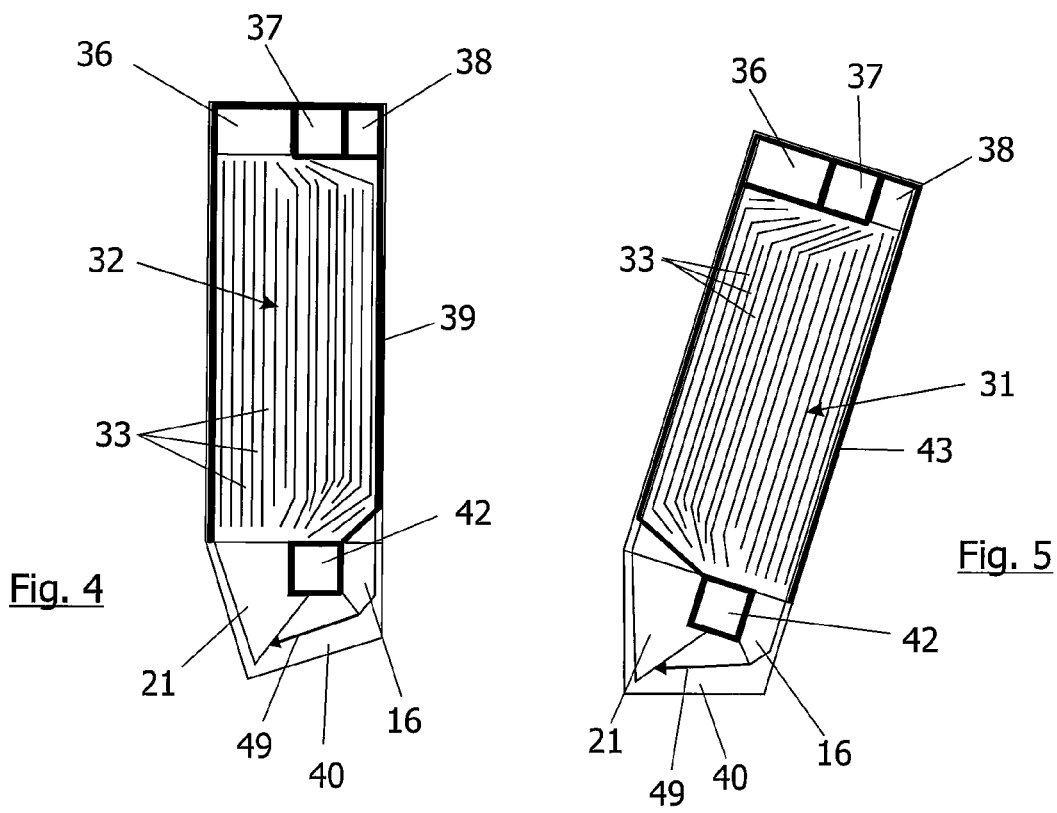
Fig. 4
Fig. 5

FUEL CELL STACK

BACKGROUND AND SUMMARY OF THE INVENTION

Exemplary embodiments of the invention relate to a fuel cell stack and a fuel cell system having a fuel cell stack.

Fuel cell stacks comprising a multiplicity of individual cells are generally known as a traditional structure for fuel cells. Here, the fuel cell stack is typically formed from a larger number of substantially prismatically shaped individual cells, which are built up to form a stack, or which consist of substantially prismatic individual parts, which are only finally assembled to form the actual individual cell in the fuel cell stack. This structure is generally known, for example in PEM fuel cells, wherein each of the individual cells has a so-called membrane electrode arrangement (MEA) comprising the membrane as well as two gas diffusion layers and electrodes. Here, a so-called flow field is provided on both the anode side and on the cathode side to supply these electrodes with the appropriate educts. The anode flow field has a multiplicity of channels that feed hydrogen to the anode, while the cathode flow field correspondingly has a multiplicity of channels that feed oxygen or air as an oxygen supplier to the cathode.

When a fuel cell or fuel cell stack is operated, electrical energy is generated from hydrogen and oxygen. As well as the electrical energy, product water, which forms at the individual electrodes and has to be discharged via the flow fields, is also shed by the educts used. In doing so, the greater part of the product water is formed on the cathode side, but a certain amount of formed product water also needs to be discharged on the anode side.

In order to guarantee a good discharge of the product water in all operating situations of the fuel cell stack, the structure described in German patent document DE 10 2006 039 105 A1, for example, attempts to improve the discharge of the product water by an inclined orientation of the flow fields of the fuel cell stack. This is possible in principle, wherein the stack has the problem that, when a vehicle, which is fitted with the fuel cell system for example, is in an inclined position, the flow fields very easily revert to a horizontal or nearly horizontal position, as a result of which, in this operating situation, the discharge of water with the assistance of gravity is then correspondingly jeopardized. A comparable embodiment is also disclosed in Japanese patent document JP 2011 009 137 A.

As well as the problem already addressed, it is the case in both embodiments that, in the usual manner, the flow fields have the media inlets on the one side and the media outlets on the opposite side. Stacking the individual cells on top of one another therefore results in a media inlet channel for each of the educts running through the stack in the stacking direction and is typically arranged at the top, while a media outlet stack running through the fuel cell in the stacking direction is ideally arranged at the bottom.

In practice, particularly when deployed in vehicles, these fuel cell stacks are still very difficult to drain, as a result of which channels within the flow fields are occasionally blocked with water, which can lead to an uneven distribution of educt gases. This can have an adverse effect on the performance of the fuel cell stack and can damage, or in the worst case reverse, the polarity of individual cells due to the lower voltage generated thereby in this case.

Exemplary embodiments of the present invention are directed to a fuel cell stack that avoids these recognized disadvantages and that guarantees safe and reliable draining of its flow fields in all operating situations and in all orientations of the fuel cell stack that typically occur when deployed, for example in a vehicle.

In a fuel cell stack according to the invention, the anode flow fields and/or the cathode flow fields have the media inlet on their upward-facing side when used as intended, and are open on their downward-facing side when used as intended. According to the invention, the anode flow fields and/or the cathode flow fields are not provided with an outlet channel for the medium running through the fuel cell stack in the stacking direction on their downward-facing side when used as intended, but are open, that is to say open to a chamber adjacent to the flow field on the appropriate lateral edge. The flow fields that are therefore formed perpendicular to the stacking direction enable the exhaust gases or exhaust air and the product water contained in these gases to escape from each individual flow field directly into the adjacent chamber. As a result, the discharge of product water formed is improved, even with a corresponding inclined position of the fuel cell stack, as the water can escape directly from the appropriate lateral edge of the flow field without first having to flow via a pipe running in the stacking direction.

In principle, it can be sufficient to design either the anode flow fields or the cathode flow fields in the manner described, wherein the cathode flow fields in particular are preferably to be designed in the manner according to the invention due to the larger amount of product water formed on the cathode side.

However, in a particularly favorable and advantageous development of the fuel cell stack according to the invention, both the anode flow fields and the cathode flow fields are open on their lateral edge facing downwards when used as intended. This enables ideal draining of both the anode side and the cathode side of the fuel cell stack.

Further, in a very advantageous embodiment of the fuel cell stack according to the invention, the chamber or chambers facing the open flow fields or open flow field is designed as a liquid separator or opens out into such. This structure of the chamber facing the open flow fields as a liquid separator or as a flow-carrying pipe leading to a liquid separator is particularly efficient, not only to remove the liquid from the flow fields of the fuel cell stack but also to safely and efficiently separate it from the exhaust gases of the fuel cell stack. As a result of the chamber adjacent to the open flow fields which, in cross-section, ideally widens considerably with respect to the cross-section of the flow fields through which liquid can flow, the flow is calmed and liquid water droplets can fall as rain. Ideally, the liquid separator is then arranged at the bottom in the direction of the gravitational force when used as intended and ideally integrated into the fuel cell stack. This results in a simple and compact structure for the fuel cell stack. By integrating the liquid separator into the fuel cell stack, it is heated together with the fuel cell stack and cooled together therewith relatively slowly so that, in the event of condensation, condensate that is formed can also be separated in the liquid separator. Even at temperatures in the environment of the fuel cell stack below freezing, the liquid separator and the liquid-carrying pipes still remain warm for a relatively long time and therefore at temperatures above freezing. This prevents early freezing of the liquid separator and the liquid-carrying pipes. The resulting condensate can therefore still flow out of the region of the fuel cell stack for a long time, thus minimizing the formation of ice in the fuel cell stack.

To further reinforce this effect, in an advantageous development, an integral drainage pipe connects the liquid separator, which is connected to the anode flow fields, to the liquid separator, which is connected to the cathode flow fields. The liquid separators can be connected to one another by means of such a drainage pipe. At the same time, this drainage pipe is also designed integral with the fuel cell stack so that it remains at a higher temperature for a comparatively long time after switching off. As a result of connecting the two liquid separators to one another, one of the liquid separators, ideally the larger liquid separator on the cathode side, is used to collect all the water. This can then be drained by means of a common pipe and an appropriate valve, for example from time to time, depending on the filling level or similar. As a result, only one valve and one control strategy is required as well as any sensors which may be necessary.

In a further very favorable embodiment of the fuel cell stack according to the invention, the stacked individual cells are bounded on at least one side by an end plate, wherein the at least one end plate extends in the stacking direction both next to the stacked individual cells and also parallel to the stacked individual cells. In this particularly favorable embodiment of the fuel cell stack according to the invention, such an end plate of the fuel cell stack can be designed with an approximately L-shaped contour. On one side of the fuel cell stack, it forms its lateral boundary and also extends at least partially parallel to the fuel cell stack. An appropriately high strength of the fuel cell stack is achieved by this means with minimal outlay regarding its support.

According to a particularly advantageous development, the part of the at least one end plate extending parallel to the stacked individual cells encompasses the chamber/chambers adjoining the open sides of the flow fields. The chambers provided for collecting the exhaust gas and/or the exhaust air and the product water contained therein can be integrated into the part of the end plate extending parallel to the stacked individual cells. This results in a particularly simple, compact and effective structure for the fuel cell stack.

At the same time, according an advantageous embodiment of this aspect the part of the at least one end plate extending parallel to the stacked individual cells has at least one liquid separator arranged at the lowest point when used as intended. The chambers can therefore be linked to a liquid separator or be designed as such, this being arranged within the part of the end plate extending parallel to the stacked individual cells at the lowest point when used as intended. As a result, the water can ideally be collected in this area using the gravitational force.

Further, in another very favorable embodiment one of the end plates, in particular in the top part of the end plate when used as intended, incorporates a gas jet pump for recirculating anode exhaust gas. Such a gas jet pump as a recirculation pumping device for recirculating anode exhaust gas can advantageously be integrated into the end plate.

In a particularly favorable development hereof, the gas jet pump is arranged in the end plate with the part extending parallel to the stacked individual cells, wherein an integrated recirculation pipe in the end plate runs from the region in which the anode flow fields are open to the gas jet pump, and wherein the recirculation pipe has a direction component in each case running in the direction of the gravitational force when used as intended and is connected to the liquid separator at its lowest point. Integrating the gas jet pump into the end plate incorporating the part running parallel to the stacked individual cells enables a recirculation pipe to be integrated into the end plate, which pipe first runs upwards along the stack at an angle to the stacking direction and then perpendicular to the stacking direction in the part of the end plate lying adjacent to the stacked individual cells. Together with the integral gas jet pump, the whole anode recirculation system can therefore be integrated into the end plate. As, when used as intended, the recirculation pipe always has a direction component running in the direction of the gravitational force, that is to say initially at an angle upwards and then, for example, vertically upwards, the remaining water carried along with the recirculating gas flow can be slowed down by the gravitational force so that it runs back along the walls of the recirculation pipe into the liquid separator connected to the recirculation pipe at the lowest point thereof. In this way, in addition to the liquid separation in the chamber and/or liquid separator arranged in the end plate, separation can also be implemented in the region of the recirculation pipe. This is particularly advantageous, as a comparatively large amount of water compared with the volume flow is present particularly in the recirculating anode exhaust gas, and as gas channels can be very easily blocked due to this water in the anode flow fields, particularly in partial load operation of the fuel cell when the freshly supplied fuel flow is comparatively small. Particularly in these situations, water separation that is as ideal as possible in the smallest possible space, which can be achieved by the end plate structure according to the invention, is of particular advantage.

The fuel cell stack according to the invention in one of the described embodiments is used in the fuel cell system according to the invention. The flow fields that are open at the bottom when used as intended already enable very good drainage of the fuel cell stack to be achieved regardless of the orientation of a vehicle which is, for example, fitted with the fuel cell system, as, for example, with a vertical alignment of the flow fields, slight deviations from the vertical direction lead to hardly any impairment of the effect of gravity on the liquid drops. In the fuel cell system according to the invention, this structure is now further improved in that, when used as intended with regard to at least one of the spatial directions perpendicular to the stacking direction, the fuel cell stack is aligned at an angle of more than 10°, preferably approximately 17° to the horizontal. In the fuel cell system according to the invention, the fuel cell stack can therefore be arranged on one edge, for example, or also, in the case of an angle in both spatial directions perpendicular to the stacking direction, on one corner, for example, when, symbolically, a substantially prismatic stack is assumed. Such an arrangement can additionally assist the drainage of water with the help of gravity, wherein, as a result of an angle of more than 10°, in particular approximately 17°, the test conditions and empirical values relating to inclines, inclined orientation of the vehicle etc., which are usually applied in the case of vehicles, are addressed. Even with an inclined orientation of the vehicle of 17°, which is typically assumed to be the maximum, drainage can still be realized with the help of gravity by an appropriate tilting of the fuel cell stack, as the fuel cell stack in turn is correspondingly tilted in the fuel cell system so that an inclined position of the vehicle is at least compensated for by the tilt.

In a favorable embodiment of the fuel cell system according to the invention the fuel cell stack has an end plate with integral gas jet pump. According to the invention the gas jet pump is arranged in the top end plate in the stacking direction when the fuel cell stack is used as intended. This arrangement of the gas jet pump in the top end plate in the stacking direction guarantees that liquid from the gas jet pump drains in the direction of the stack or the recirculation pipe, so that the risk of the gas jet pump being impaired in its operation by liquid water or becoming blocked can be prevented.

Advantageous embodiments and developments of the fuel cell stack according to the invention and of a fuel cell system incorporating the fuel cell stack according to the invention are clear from the exemplary embodiment described in more detail below with reference to the figures.

BRIEF DESCRIPTION OF THE DRAWING FIGURES

In the drawings:

FIG. 3 shows a schematic sectional diagram through the cathode side of the fuel cell stack according to the invention;

FIG. 4 shows a view of a cathode flow field in a sectional diagram through the fuel cell stack; and FIG. 5 shows a view of an anode flow field in a sectional diagram through the fuel cell stack.

DETAILED DESCRIPTION

Figure 1:
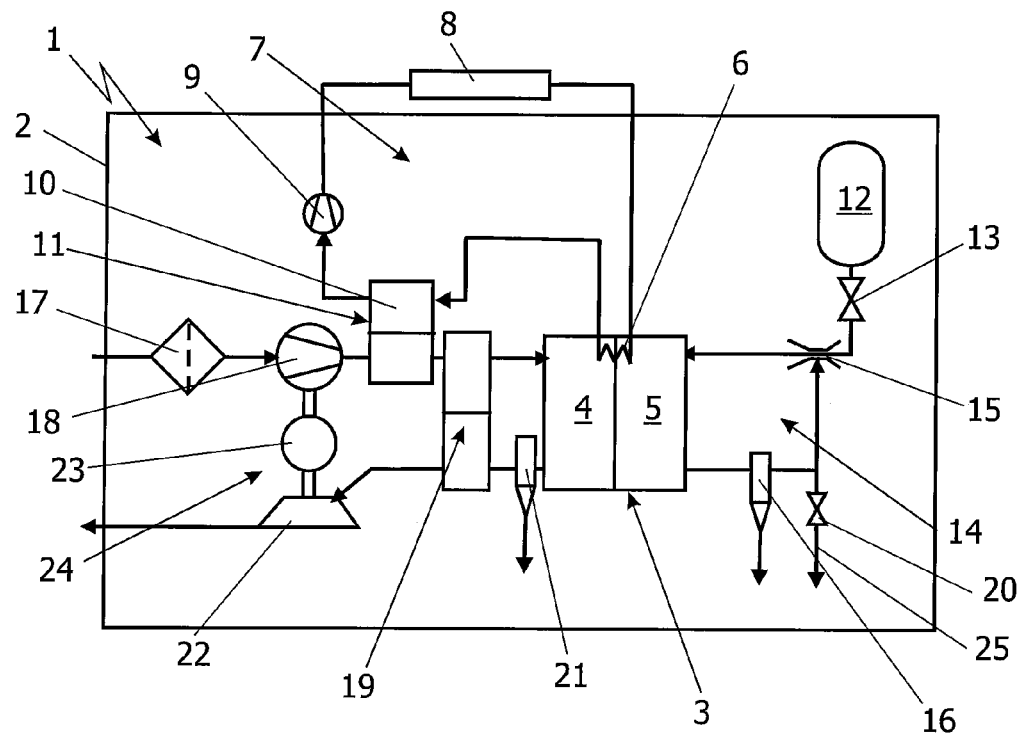
FIG. 1 shows a schematic diagram of a fuel cell system in a vehicle.

A schematic representation of a fuel cell system 1 can be seen in the diagram of FIG. 1. The fuel cell system 1 is intended to be arranged in a depicted vehicle 2 and is to be used therein for providing electrical drive power. The fuel cell system 1 substantially comprises a fuel cell stack 3 made up of a stack of individual PEM fuel cells. Here, each of these individual cells 26 has an anode region and a cathode region so that the fuel cell stack 3 also encompasses a cathode chamber 4 and an anode chamber 5. A cooling heat exchanger 6 is also provided for dissipating waste heat. This is part of a cooling circuit 7 of the fuel cell system 1 shown in a highly simplified form, which dissipates waste heat to the environment of the vehicle 2 via a cooler 8 as is usual in vehicles. The cooling circuit 7 also incorporates a cooling medium pump device 9 and a further heat exchanger 10. This is part of a charge air cooler 11, which is described in more detail later.

Hydrogen, as an educt from a compressed gas reservoir 12, is fed to the anode chamber 5 of the fuel cell stack 3. The hydrogen passes to the region of the anode chamber 5 of the fuel cell stack 3 via a dosing and pressure regulating device 13. Unused hydrogen can be discharged from the anode chamber 5 by means of a so-called anode recirculation system 14 and returned to the anode chamber together with fresh hydrogen via a recirculation pump device 15. The recirculation pump device 15 is designed as a gas jet pump. Here, a water separator 16, by means of which collected liquid water is discharged either continuously or from time to time, is typically provided in the region of the anode recirculation system 14. A so-called purge valve 20 and a drain pipe 25 can also be arranged in the anode circuit 14, for example in the region of the water separator 16 and/or also independently thereof. Self-enriching nitrogen can be discharged therefrom from time to time in order to maintain the hydrogen concentration in the anode circuit 5 at a constantly high level for the functionality of the fuel cell stack 3.

Air, as an oxygen supplier, is fed to the cathode chamber 4 of the fuel cell stack 3. The air passes to the cathode chamber 4 of the fuel cell stack 3 via an air filter 17, an air pump device 18 and the already mentioned charge air cooler 11 as well as a humidifier 19. The feed air, which is compressed and thereby heated after the air pump unit 18, is first cooled by means of the charge air cooler 11 which, in the exemplary embodiment shown here, is also incorporated in the cooling circuit 7. The cooled air then passes via a humidifier 19, which, in particular, is designed as a gas-gas humidifier, to the region of the cathode chamber 4. The oxygen-depleted air, which is laden with product water from the fuel cell stack 3, flows out of the cathode chamber 4 via a water separator 21. It passes into the humidifier 19 and releases moisture contained therein through water-vapor-permeable membranes of the humidifier 19, which, for example, can be designed as a plate humidifier or as a humidifier with hollow fiber membranes, to the air flowing from the charge air cooler 11 to the cathode chamber 4 and humidifies it. In the exemplary embodiment shown here, after the humidifier 19, the exhaust air returns to the environment via a turbine 22. In doing so, the turbine 22 expands the exhaust air and, at the same time, uses the residual heat and pressure energy still contained in the exhaust air in order to at least partially recover it. Furthermore, an optional burner could be provided before the turbine 22 in order to increase the energy yield in the turbine 22, particularly in certain operating phases.

The turbine 22 is arranged on a common shaft together with the air pump device 18, thus enabling the recovered power to directly assist the drive of the air pump device 18. As the recovered power is typically not sufficient to fully drive the air pump device 18 in normal operation, an electrical machine 23 is additionally arranged on the shaft. The structure as a whole is referred to as a so-called electric turbocharger 24 or ETC. The required further pumping power of the air pump device 18 can be provided by means of the electrical machine 23 in motoring mode. If, in certain situations, more power is available in the region of the turbine 22 than is required by the air pump device 18, then the electrical machine 23 can also be operated as a generator in order to feed electrical power into the on-board electrical system of the vehicle 2.

The fuel cell system 1 in the vehicle 2 that has been described up to now complies with the principle of a fuel cell system 1 as known from the prior art. As well as the embodiments described, it can also feature alternative variants, for example in that the anode circuit 14 is omitted, or the charge air cooler 11 cools via the exhaust air after the humidifier 19 instead of via the cooling circuit 7. Comparable alternative embodiments are likewise known from the prior art and can, of course, equally be used for the embodiments of the fuel cell system 1 according to the invention described below.

Figure 2:
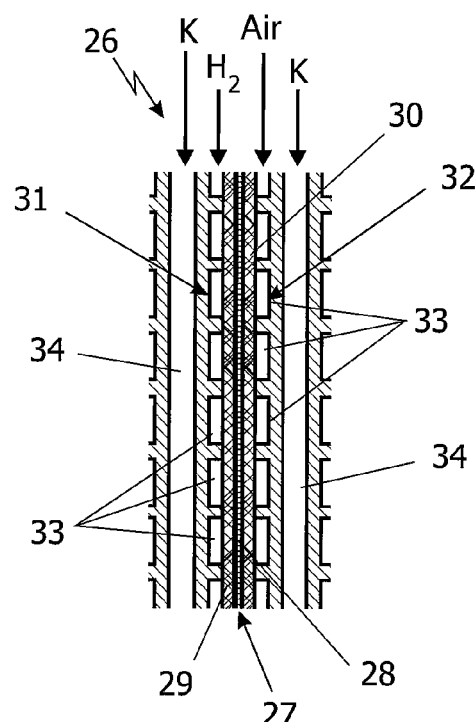
FIG. 2 shows a sectional diagram through an individual cell in a fuel cell stack.

A possible structure of an individual cell 26 or a section of the fuel cell stack 3 can now be seen in the diagram of FIG. 2 in a detailed sectional view. In the core, each of the individual cells 26 has a so-called membrane electrode arrangement 27, which has a proton exchange membrane 28 in the center and, adjacent thereto in each case, a gas diffusion layer and electrode 29 on the anode side and a corresponding gas diffusion layer and electrode 30 on the cathode side. Adjacent thereto, an anode flow field 31 is arranged on the anode side, and a cathode flow field 32 on the cathode side. The flow fields 31, 32 each have channels 33 that are supplied with the respective educt, that is to say hydrogen ($H_2$) on the anode side and air on the cathode side, as oxygen supplier. A distribution of the educts through the respective flow field 31, 32 to the electrodes 29, 30 that is as uniform as possible is achieved by means of the channels 33. Regions 34, through which a cooling medium (K) flows, are in each case arranged adjacent to the flow fields 31, 32 before the respective flow field 31, 32 of the adjacent individual cell 26 follows. The structure described here is to be understood as being purely exemplary. Appropriate alternatives are conceivable, for example flow fields integrated on so-called bipolar plates together with cooling medium channels such that they form the anode flow field on their one side and the cathode flow field on the other side.

The individual cells 26 are then stacked appropriately in the fuel cell stack 3. A schematic sectional diagram can be seen in FIG. 3, wherein, here, the section has been implemented so that it shows the anode side of the fuel cell stack 3 with regard to the media carried therein in more detail. Here, the cathode side is designed in a similar way, so that, in the following, the functional principle of the fuel cell stack 3 is only described with reference to the anode side. From this, the structure of the cathode side will be obvious for the person skilled in the art.

In the exemplary embodiment of FIG. 3 shown, the fuel cell stack 3 is mounted on one edge 35, thus resulting in an angle between the stacking direction designated by S and the horizontal designated by W when the fuel cell stack 3 is used as intended in the fuel cell system 1. Here, the angle can be, in particular, 17°, thus continuing to result in an at least horizontal alignment of the fuel cell stack 3 when the vehicle 2 is inclined at a normally assumed maximum of 17° in the driving direction and/or perpendicular thereto, which guarantees its particular functionality, as described in more detail later, even in this situation.

Here, the angle between the horizontal W and the stacking direction S is chosen such that the gas jet pump 15 indicated at the top right in the diagram of FIG. 3 is arranged as a recirculation pump device at the top when used as intended, thus enabling blocking of the gas jet pump 5 by water to be safely and reliably prevented. Only the open anode chambers 5 formed by the channels 33 of the anode flow fields 31 and, alternately thereto, in each case the cathode chambers 4 that are shown closed, of the individual cells 26 are depicted in the diagram of FIG. 3.

The flow fields associated with each of the individual cells 26 can be seen in more detail in the diagrams of FIGS. 4 and 5. Here, FIG. 4 shows the cathode flow field 32 and FIG. 5 the anode flow field 31. Here, as can be seen in the diagram of FIG. 4, the cathode flow field is designed such that an air inlet 36, a cooling medium inlet 37 and a hydrogen inlet 38 are arranged in its upper region. The respective media can flow through these openings of the media inlets 36, 37, 38 through the stack of individual cells 26 in the stacking direction S of the fuel cell stack 3. At the same time, a cathode seal 39, which, purely as a seal 39 or in combination with appropriate webs of the cathode flow field 32, ensures that the air inlet 36 is connected to the channels 33 of the cathode flow field 32, while the cooling medium inlet 37 and the hydrogen inlet 38 are not connected to the cathode flow field 32 or to its channels 33, can be seen in the diagram of FIG. 4. The air can therefore pass along the channels 33 in the region of the cathode and the gas diffusion layer 30 at this point.

A part 40 of the end plate 41 of the fuel cell stack 3 running parallel to the stacking direction S can be seen below the cathode flow field 32. This region incorporates a liquid separator forming the water separator 21 according to the exemplary embodiment of FIG. 1. Next to this can be seen a cooling medium outlet 42 and an anode-side water separator 16. Here, the cathode seal 39 is designed such that the exhaust air together with the product water formed can only pass to the region of the water separator 21, while the water separator 16 and the environment of the fuel cell stack 3 are appropriately sealed with respect to the channels 33 in the cathode flow field 32 by means of the cathode seal 39.

In a similar way, a corresponding view of the anode flow field 31 with its channels 33 can be seen in the diagram of FIG. 5. The structure corresponds substantially to that of the cathode flow field 32, wherein, here, the air inlet 36 and the cooling medium inlet 37 are sealed with respect to the channels 33 of the anode flow field 31 by means of an anode seal 43, while the hydrogen inlet 38 is connected thereto. On the side of the anode flow field 31 facing downwards when used as intended, this in turn is open and opens out directly, perpendicular to the stacking direction, into the already described water separator 31 in the part 40 of the end plate 41 running in the stacking direction. Accordingly, the anode seal 43 is likewise open in this region, thus enabling water to drain out of the anode flow field 31 into the water separator 16 or to be conveyed thereto along with the exhaust gas.

If, in turn, we consider the fuel cell stack 3 in FIG. 3 in the sectional view from the side, then it can be seen that the flow fields 31, 32, which are open at the bottom, open into a chamber 44 that opens out into the water separator 16. Here, the walls of the chamber 44 are likewise inclined— ideally likewise at 17°—thus guaranteeing draining of the water escaping from the open lateral edges of the anode flow fields 31 in the direction of the water separator 16 in all cases, even when the vehicle 2 is in an inclined position.

At the same time, as well as the inclined position shown in FIG. 3, the fuel cell stack 3 mounted on the edge 35, an additional inclined position in the direction perpendicular thereto is also possible. This is indicated in the diagram of FIG. 5 and can be used alternatively or in addition to the inclined position shown in FIG. 3. In each case an angle of 17° is preferred for the angle for reasons described above.

The structure that can be seen in the diagram of FIG. 3 enables the water to be safely and reliably extracted via the open lateral edges of the anode flow fields 31 that are open at the bottom when used as intended. The same applies in a comparable manner for the cathode flow fields 32. Here, the fuel cell stack 3 has the already mentioned end plate 41, which incorporates the chamber 44 and the water separator 16 in a part 40 of the end plate 41 running in stacking direction S. In addition, in a manner which is known per se, the end plate has a part 45 lying perpendicular to the stacking direction adjacent to the stack of individual cells. The already mentioned gas jet pump 15, for example, is integrated into this part 45 of the end plate 41. As well as the gas jet pump 15, a recirculation pipe 46 of the anode recirculation system 14 is also integrated into the end plate 41. Starting from its lowest region, in which it opens out into the water separator 16, it first runs upwards at an angle to the stacking direction S to then lead perpendicular to the stacking direction S to the intake region of the gas jet pump 15. As a result of gravitational force, anode exhaust gas flowing in the recirculation pipe 46 is thereby freed from any liquid droplets contained therein which, following the gravitational force, run down through the recirculation pipe 46 against the direction of flow of the exhaust gas and collect there in the region of the water separator 16. This arrangement of the recirculation pipe 46 therefore always results in a direction component within the recirculation pipe 46 which runs in the direction of the gravitational force g, thus also enabling the water in this region to drain in an ideal manner and collect in the water separator 16.

In addition, a propellant gas flow pipe 47 can also be integrated into the end plate 41. In the diagram of FIG. 3, this can be connected at its bottom region to the compressed gas reservoir 12 or to its pressure control device. It leads through the end plate 41, thus enabling the hydrogen from the compressed gas reservoir 12 as a propellant gas flow to match its temperature to the temperature of the fuel cell stack 3 due to the comparatively high thermal capacity of the fuel cell stack 3 and particular of its end plate 41. The propellant gas flow then flows out of the propellant gas flow pipe 47 via a dosing valve 48 which, for example, can be part of the already mentioned pressure control and dosing device 13, as a propellant stream into the gas jet pump 15 and ensures, by means of vacuum and momentum exchange, that the exhaust gas flow of the fuel cell stack 3 sucked in via the recirculation pipe 46 is fed to the anode chambers 5 once more. Pre-heating the hydrogen in the propellant gas flow pipe 47 minimizes the risk of moisture condensing from the anode exhaust gas in the mixed gas flow.

Here, the end plate 41 with the part 40 running parallel to the stacking direction S can be ideally used to stiffen and mechanically stabilize the fuel cell stack. The end plate 41 can also be used to stack the individual cells 26 of the fuel cell stack 3 directly on the end plate 41 and then clamp them, for example by means of tensioning straps (not shown), to the fuel cell stack 3.

As well as this structure on the anode side of the fuel cell stack 3, a comparable structure of the cathode side exists in a parallel plane thereto, for example in front of or behind the sectional view in FIG. 3, wherein, here, the recirculation pipe is omitted. Exhaust gas from the anode chamber 5 or the anode recirculation system 14 and water from the water separator 16 must be drained, for example, from time to time or depending on a filling level or a substance concentration. A valve device 48, which can comprise a valve for water and/or the purge valve 20, can be provided for this purpose. For example, the water can be discharged into the environment and/or flow into the water separator 21 of the cathode side as indicated schematically by a schematically arranged drainage pipe 49 within the part 40 of the end plate 41 in the diagrams of FIGS. 4 and 5.

The discharge pipe 25 for draining the exhaust gas out of the anode circuit 14 can preferably lead into the region of the air that is fed to the cathode chambers 4, so that any residual hydrogen in the exhaust gas is oxidized at the catalytic converter of the cathode 28 together with the oxygen in the air and rendered harmless. In the diagram of FIG. 3, the drain pipe 25 is shown schematically within the end plate 41 where it runs into a region 50 which accordingly connects it to the air inlets 36 of the fuel cell stack 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fuel cell stack, comprising:
a multiplicity of stacked individual cells, each comprising an anode flow field, a membrane electrode arrangement, and a cathode flow field,
wherein each of the anode and cathode flow fields has a media inlet and channels configured to carry media,
wherein the anode flow fields and the cathode flow fields have the media inlet on an upward-facing side of the flow fields, and
wherein the anode flow fields and the cathode flow fields are open on a downward-facing side of the flow fields such that open lateral edges of the anode flow fields and the cathode flow fields open into a chamber and such that water can escape directly from the open lateral edges to the chamber without having to flow via a pipe.

2. The fuel cell stack of claim 1, further comprising:
seals, which are open on their downward-facing side, are arranged between the membrane electrode arrangement and the anode and cathode flow fields.

3. The fuel cell stack of claim 1, wherein the chamber is a liquid separator or opens out into a liquid separator.

4. The fuel cell stack of claim 3, wherein the liquid separator includes a first liquid separator connected to the anode flow fields and a second liquid separator connected to the cathode flow field, the fuel cell stack further comprising:
an integral drainage pipe connecting the first liquid separator to the second liquid separator.

5. The fuel cell stack of claim 3, further comprising:
an integral drainage pipe connecting the chamber, which is connected to the anode flow fields, to the media inlet of the cathode flow fields.

6. The fuel cell stack of claim 1, wherein the stacked individual cells are bounded on at least one side by an end plate, wherein the end plate extends in a stacking direction both next to the stacked individual cells and also parallel to the stacked individual cells.

7. The fuel cell stack of claim 6, wherein a part of the end plate that extends parallel to the stacked individual cells encompasses the chamber that adjoins the open sides of the anode and cathode flow fields.

8. The fuel cell stack of claim 7, wherein the part of the end plate that extends parallel to the stacked individual cells has at least one liquid separator arranged at a lowest point.

9. The fuel cell stack of claim 6, wherein a top part of the end plate incorporates a gas jet pump configured to recirculate anode exhaust gas.

10. The fuel cell stack of claim 9, wherein the gas jet pump is arranged in the end plate with the part that extends parallel to the stacked individual cells, wherein an integral recirculation pipe in the end plate runs from a region in which the anode flow fields are open to the gas jet pump, and wherein the recirculation pipe has a direction component in each case running in a direction of the gravitational force and is connected to a liquid separator at a lowest point of the liquid separator.

11. The fuel cell stack of claim 9, wherein the gas jet pump is connected to a compressed gas reservoir for hydrogen, by a propellant gas pipe, wherein the propellant gas pipe runs partially through the end plate with the gas jet pump such that the propellant gas pipe enters the end plate on a side facing away from the gas jet pump.

12. A fuel cell system, comprising:
a fuel cell stack, which comprises
a multiplicity of stacked individual cells, each comprising an anode flow field, a membrane electrode arrangement, and a cathode flow field,
wherein each of the anode and cathode flow fields has a media inlet and channels configured to carry media,
wherein the anode flow fields and the cathode flow fields have the media inlet on an upward-facing side of the flow fields,
wherein the anode flow fields and the cathode flow fields are open on a downward-facing side of the flow fields such that open lateral edges of the anode flow fields and the cathode flow fields open into a chamber and such that water can escape directly from the open lateral edges to the chamber without having to flow via a pipe, and wherein with regard to at least one of a spatial direction perpendicular to a stacking direction, the fuel cell stack is aligned at an angle of more than 15° to horizontal.

13. The fuel cell system of claim 12, wherein with regard to at least one of the spatial directions perpendicular to the stacking direction, the fuel cell stack is aligned at an angle of approximately 17° to the horizontal.

14. The fuel cell system of claim 12, wherein the fuel cell stack incorporates a first end plate with integral gas jet pump and a second end plate, wherein the first end plate is arranged further upward than the second end plate.

* * * * *